(12) United States Patent
Bührmann

(10) Patent No.: US 7,426,966 B2
(45) Date of Patent: Sep. 23, 2008

(54) APPARATUS FOR IMPARTING RELATIVE MOVEMENT BETWEEN AN OSCILLATING MEMBER AND A RAIL

(75) Inventor: Rudolph Bührmann, Johannesburg (ZA)

(73) Assignee: The Buhrmann Trust, Pretoria West (ZA)

( * ) Notice: Subject to any disclaimer, the term of this patent is extended or adjusted under 35 U.S.C. 154(b) by 0 days.

(21) Appl. No.: 10/552,942

(22) PCT Filed: Apr. 14, 2004

(86) PCT No.: PCT/IB2004/001130

§ 371 (c)(1),
(2), (4) Date: Nov. 1, 2006

(87) PCT Pub. No.: WO2004/090384

PCT Pub. Date: Oct. 21, 2004

(65) Prior Publication Data

US 2007/0068293 A1    Mar. 29, 2007

(30) Foreign Application Priority Data

Apr. 14, 2003  (ZA) .................................. 02/8246

(51) Int. Cl.
*E21B 1/00*    (2006.01)
*B23Q 5/52*    (2006.01)

(52) U.S. Cl. .................... 173/141; 173/55; 173/156

(58) Field of Classification Search .............. 173/141, 173/18, 38, 53, 54, 55, 56, 156; 175/122, 175/299, 300, 304; 310/12, 26

See application file for complete search history.

(56) References Cited

U.S. PATENT DOCUMENTS

| | | | |
|---|---|---|---|
| 46,849 A | * | 3/1865 | Howson ...................... 173/53 |
| 131,640 A | * | 9/1872 | Swinebroad ................. 100/274 |
| 196,788 A | * | 11/1877 | Cummings .................... 173/55 |
| 510,039 A | * | 12/1893 | Michaels et al. .............. 173/55 |

(Continued)

FOREIGN PATENT DOCUMENTS

| DE | 1 550 374 | 12/1969 |
|---|---|---|
| GB | 24390 | 7/1912 |

*Primary Examiner*—Paul R Durand
(74) *Attorney, Agent, or Firm*—Finnegan, Henderson, Farabow, Garrett, & Dunner, L.L.P.

(57) ABSTRACT

The invention provides an apparatus (2) for imparting relative movement between an oscillating member and a rail (4). The apparatus (2) comprises a support (6) in the form of a housing providing a fulcrum (8) and biasing means (10) to bias a lever (18) about the fulcrum (8). The lever (18) has an engaging formation (20) spaced apart along its length from the fulcrum (8). The engaging formation (20) is configured to selectively grip and release the rail (4). In one embodiment of the inventions application, the housing (6) is secured to a percussion rock drill and the rail (4) secured in a position to allow drilling as desired. The lever (18) supports the rock drill above the rail (4). The oscillation of the drill and housing causes the lever (18) to pivot about the fixed fulcrum (8) against the bias of the biasing means (10). This disengages the grip of the engaging formation (20) and the drill is advanced along the rail (4). The mechanism is based on a friction drive on a rail (4) provided by applying force to an over center cross-corner locking lever (18) in one direction to produce a friction lock on the rail (4) and then applying force in the return direction to make the lever (18) slip along the rail (4). In this way the lever (18) forms a walking thrust arm for an oscillating member. The invention also provides for the same mechanism to be used to effect reverse movement of the drill along the rail (4). The rail (4) need not be straight and the mechanism can also be used to move a rail (4) in relation to an oscillating member.

10 Claims, 2 Drawing Sheets

U.S. PATENT DOCUMENTS

| | | | |
|---|---|---|---|
| 541,256 A * | 6/1895 | Willard | 173/55 |
| 542,010 A * | 7/1895 | Chapman | 173/55 |
| 1,241,327 A * | 9/1917 | Becker | 173/39 |
| 1,553,608 A * | 9/1925 | Glaser | 173/156 |
| 2,066,927 A * | 1/1937 | Curtis | 173/154 |
| 2,134,420 A * | 10/1938 | Smith, Sr. | 188/82.2 |
| 2,534,857 A * | 12/1950 | Crewe | 74/169 |
| 2,668,690 A * | 2/1954 | Alexander | 173/35 |
| 2,682,004 A * | 6/1954 | Schulenburg | 310/23 |
| 3,273,658 A * | 9/1966 | Ytterfors et al. | 173/141 |
| 3,593,829 A * | 7/1971 | Williams | 192/141 |
| 4,306,626 A * | 12/1981 | Duke et al. | 173/35 |
| 5,013,945 A * | 5/1991 | Adolfsson | 310/26 |
| 5,315,202 A * | 5/1994 | LaSota | 310/20 |
| 6,279,667 B1 * | 8/2001 | Culver | 175/19 |
| 6,883,620 B1 * | 4/2005 | Cadet | 173/106 |
| 2005/0199405 A1 * | 9/2005 | Raunisto | 173/53 |

\* cited by examiner

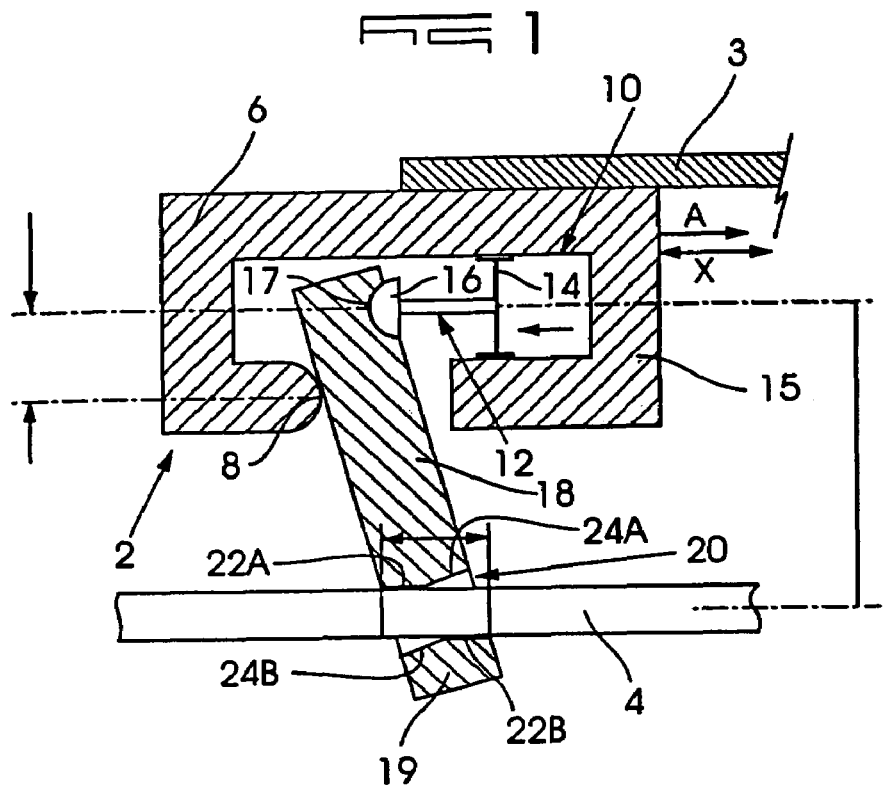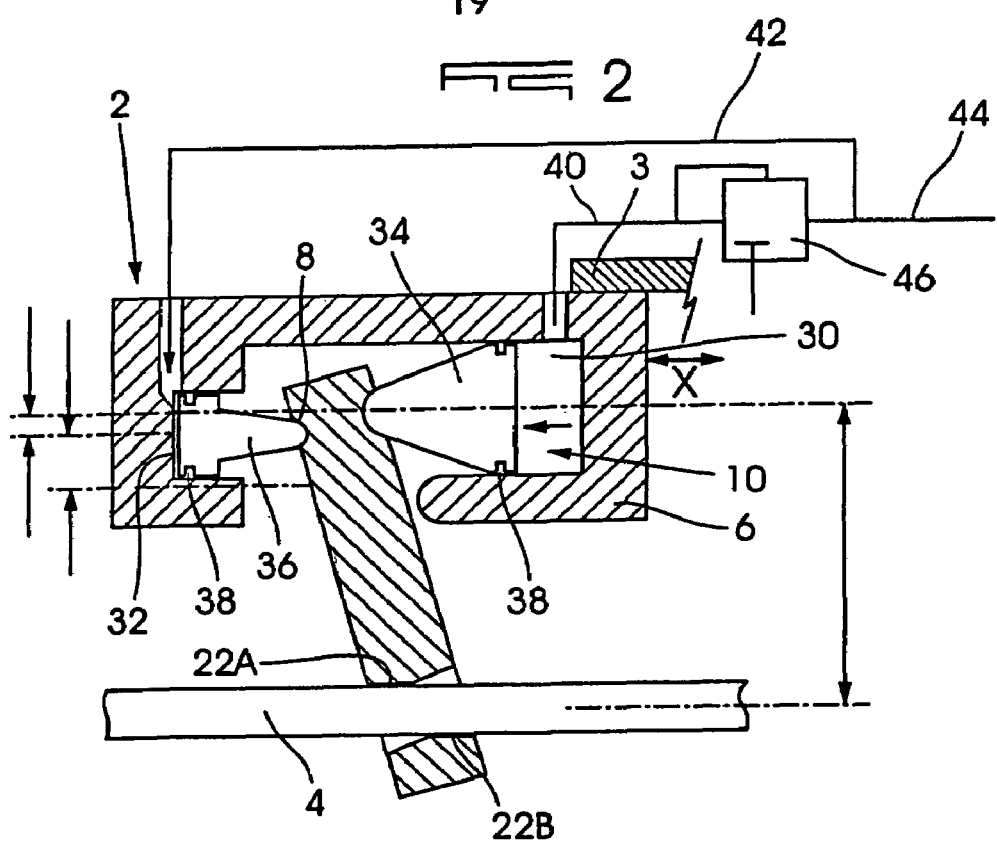

APPARATUS FOR IMPARTING RELATIVE MOVEMENT BETWEEN AN OSCILLATING MEMBER AND A RAIL

FIELD OF THE INVENTION

The invention relates to an apparatus that imparts relative movement between an oscillating member and a rail.

BACKGROUND OF THE INVENTION

It is sometimes required that an oscillating member be moved in a particular direction. Where this is necessary, use is made of separate moving means to advance the member in that direction. This means is usually heavy, cumbersome and costly. An example of such an oscillating member is an underground percussion drill that requires thrusting. The thrusting is often effected with a drill leg or rig thrust cylinder.

It may also be favourable to convert the oscillation of an oscillating member into movement of a separate member.

OBJECT OF THE INVENTION

It is an object of this invention to provide an apparatus that coverts the oscillation of an oscillating member into relative movement between the member and a rail.

SUMMARY OF THE INVENTION

In accordance with this invention there is provided an apparatus for imparting relative movement between an oscillating member and a rail, comprising a support securable to the oscillating member providing a first fulcrum and a first biasing means to bias a lever about the first fulcrum, with the first fulcrum and the first biasing means spaced apart along the length of the lever, and the lever having, spaced along its length from the first fulcrum, an engaging formation whereby a rail is slidably engageable, and the engaging formation configured to selectively grip and release the rail.

Further features of the invention provide for the first biasing means to resiliently bias the lever; for the first fulcrum to be resiliently biased toward the lever; for the engaging formation to be configured to provide the lever with an over center cross-corner friction lock fit to the rail; and for the first fulcrum to be a second biasing means that biases the lever against a second fulcrum provided by the support.

Further features of the invention provide for the fulcrums to engage the lever between their respective biasing means and the engaging formation of the lever; for the first biasing means and second biasing means to be piston and cylinder assemblies with the pistons contacting the lever; and for the piston and cylinder assemblies to be hydraulic or pneumatic.

A further feature of the invention provides for there to be cooperating ball and socket bearing formations between the lever and biasing means and/or fulcrums; and for the engaging formation to be a passage through the lever.

Further features of the invention provide for the engaging formation to provide a pair of parallel opposed line contact points locatable on opposite sides of the rail and spaced apart along the length of the rail or for the engaging formation to provide a pair of opposed engaging surfaces that are transversely inclined relative to the axis of the lever, locatable on opposite sides of the rail and offset along the length of the rail; and for the engaging surfaces to be parallel.

Further features of the invention provide for the support to be a carriage whereon a percussion drill is secured or for the support to be integral with the casing of a drill.

The term "over center cross-corner friction lock fit" as used in this specification to describe the engagement of the rail by the lever is not to be understood as a limitation to the lever only extending upwardly relative to the rail.

BRIEF DESCRIPTION OF THE DRAWINGS

The invention will now be described by example only with reference to the drawings in which:

FIG. 1: shows a schematic cross-sectional view of a first embodiment of the invention;

FIG. 2: shows a schematic cross-sectional view of a second embodiment of the invention arranged for forward movement;

DETAILED DESCRIPTION OF THE INVENTION

Figure 3:
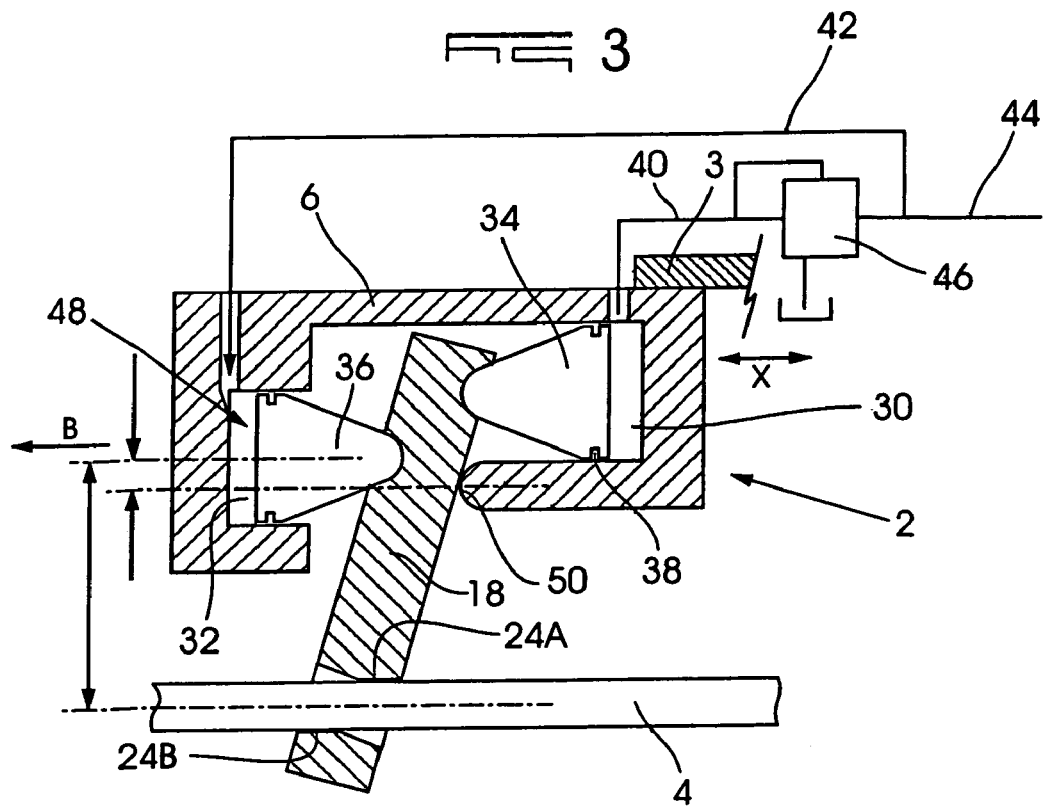
FIG. 3: shows a similar view of the embodiment of FIG. 2 arranged for rearward movement.

Referring to FIG. 1, an apparatus (2) for imparting relative movement between an oscillating member (3) and a rail (4), in accordance with the invention, is shown. This embodiment of the apparatus (2) is for the advance of the oscillating member (3) along the rail (4).

The apparatus (2) has a support (6) in the form of a housing. The housing (6) provides a fixed fulcrum (8). A biasing means (10) is located in the housing (6) opposite to the fulcrum (8). The biasing means (10) has a biasing member (12) with a base (14) at one end and head (16) at the other. It also includes resilient means (not shown) that is located between the base (14) and the wall (15) of the housing (6) in line with the base (14). The resilient means may be a spring of any suitable type.

A lever (18) extends into the housing (6) between the fulcrum (8) and the head (16) of the biasing member (12). The lever (18) is resiliently biased about the fulcrum (8) by the biasing means (10). The head (16) of the biasing member (12) and the fulcrum (8) are offset to be spaced apart along the length of the lever (18). The head (16) of the biasing member (12) forms a ball that cooperates with a socket (17) located on the lever (18) to provide ball and socket bearing communication between these components (12) and (18).

Spaced apart from the free end (19) of the lever (18) is an engaging formation (20) that is slidably engageable with the rail (4). The engaging formation is a passage (20) extending transversely through the lever (4). The passage (20) has a first pair of opposed engaging surfaces (22A) and (22B) and a second pair (24A) and (24B) that are transversely inclined relative to the axis of the lever (4). The pairs of engaging surfaces, (22A) and (22B), and (24A) and (24B), are respectively locatable against and on opposite sides of the rail (4) and offset along the length of the rail (4). This engagement provides the cross-corner friction lock between the lever (18) and the rail (4). The adjacent surfaces (22A) and (24A), and (22B) and (24B), of each pair of engaging surfaces, that are on the same side of the passage (20) are inclined at an obtuse angle relative to each other providing an apex along the line where they meet. The engaging formation (20) is configured to selectively grip and release the rail (4) and provides the lever (18) with an over center cross-corner friction lock fit to the rail (4).

In use, the housing (6) is secured to an oscillating member (3) of a machine driven to have an oscillatory motion, such as a percussion rock drill. In the case of a rock drill, the rail (4) is secured in spaced apart relationship to the footwall of a mining tunnel and in line with the direction in which movement is required. This is also in line with the oscillation of the drill. The lever (18) is engaged with the rail (4) by its engaging formation (20).

The drill to which the housing (6) is secured will be carried by separate supports (not shown) which will provide guided movement of the drill along the rail (4) under action of the lever (18). Such supports may take any suitable form.

When the drill is started, its oscillation is communicated to the housing (6). The drill is mounted facing in a forward direction (A). As a result of the oscillation of the drill, there is alternating forward (A) and rearward motion of the housing (6). The direction of the oscillation is indicated by the arrow (X). The rearward motion of the housing (6) takes place against the lock of the lever (18) to the rail (4). This motion is in the same direction as the resilient bias of the biasing means (10). Forward (A) motion of the housing (6) causes the lever (18) to react against the bias of the biasing means (10). The resilience of this bias is selected to be overcome by the force of the forward (A) motion of the housing (6). The lever (18) pivots about the fixed fulcrum (8) against the bias of the biasing means (10). This disengages the lock of the engaging formation (20) and allows the lever (18) to slip along the rail (4) in a forward (A) direction. The following rearward motion of the housing (6) once again engages the lock of the engaging formation (20) to prevent movement along the rail (4) in a rearward direction. In this way the drill advances to the front (A) of the housing (6) in the forward (A) direction along the rail (4).

Referring to FIGS. 2 and 3, which show a second embodiment of the invention, the housing (6) provides a pair of cylinders (30) and (32) with a pair of pistons (34) and (36) slidably located therein, respectively. The lever (18) is substantially the same as that of the first embodiment shown in FIG. 1. Seals (38) about the pistons (34) and (36) provide a closed fluid system wherein each of the cylinders (30) and (32) are respectively fed fluid under pressure through a pair of lines (40) and (42) from a source line (44). The line (40) to cylinder (30) has a control valve (46). The pistons (34) and (36) both have bodies which terminate in heads similar to that of the biasing member (12) of the first embodiment.

The first piston (34) and cylinder (30) assembly are of greater diameter than the second piston (36) and cylinder (32) assembly and provide the biasing means (10) in FIG. 2. The greater diameter of the first piston (34) and cylinder (30) assembly provides that the force exerted on the first piston (34) is greater than the force exerted on the second piston (36). Accordingly, the force exerted on the second piston (36) is overcome by that exerted on the first piston (34) and the second piston (36) is biased into its cylinder to provide a fixed fulcrum (8).

The mechanism of advance is the same as that of the first embodiment described with reference to FIG. 1.

It will be appreciated that the advance of the drill is dependant on the penetration of rock by the drill steel. The lever (18) will not slip forwardly along the rail (4) when the drill steel hits a patch of hard rock that is not immediately penetrated and the reaction will be absorbed by the piston and cylinder assemblies within the housing.

In FIG. 3, the control valve (46) is used to reduce the pressure in the cylinder (30). As a result, the first piston (34) is biased into its cylinder (30) by the second piston (36). The second piston (36) and cylinder (32) now operate as a second biasing means (48). The second biasing means (48) biases the lever (18) in the opposite direction to the bias of the first biasing means (10) provided by the first piston (34) in FIG. 2. The lever (18) is thus biased about a second fixed fulcrum (50) provided by the housing (6). This engages the engaging surfaces (24A) and (24B) to provide the over center cross-corner friction lock. The biasing means (48) and fixed fulcrum (50) are now on opposite sides of the lever (18) to those (10) and (8), respectively, shown in FIG. 2. It will be appreciated that the same mechanism of advance will now result in the movement of the housing (6) and the drill along the rail (4) in the rearward (B) direction.

By controlling the pressure in the cylinder (30) of the first biasing means (10), the forces exerted on the first (34) and second (36) pistons can be brought to equilibrium so that the lever (18) is held substantially perpendicular to the rail (4). When this is done, there is no cross-corner grip to the rail (4). The housing (6) and drill will then oscillate without any forward (A) or rearward (B) advance along the rail (4).

Figure 4:
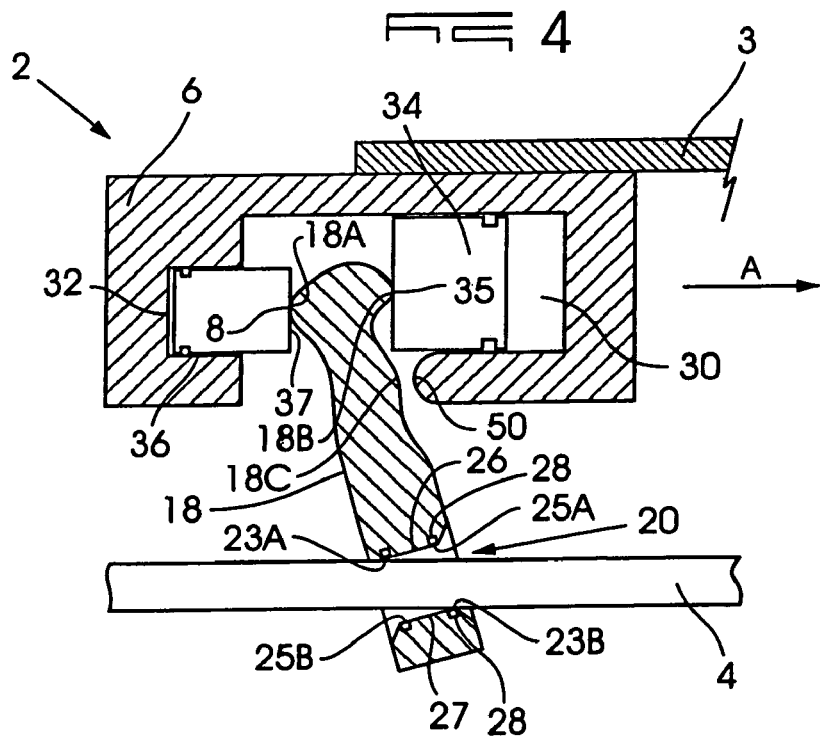
FIG. 4: shows a schematic cross-sectional view of a further embodiment.

Referring to FIG. 4, a further embodiment of the invention is shown. The housing (6) and operation of this embodiment corresponds substantially with that the second embodiment and the apparatus (2) is set for forward (A) movement as shown in FIG. 2. The fluid lines of the closed fluid system are not shown. In this embodiment the pistons (36) and (34) provide flat bearing surfaces (37) and (35) at their free ends.

The lever (18) is provided with outwardly curved formations (18A) and (18B) which are engaged by the pistons (36) and (34), respectively. The first fulcrum (8) is provided by the piston (36) as bearing surface (37) against which formation (18A) rolls as the lever (18) pivots. The same contact is provided between the formation (18B) and bearing surface (35) of piston (34).

The lever (18) also has a third curved formation (18C) which engages against the fixed fulcrum (50) for rearward movement as described with reference to FIG. 3.

The engaging formation (20) of the lever (18) is again a passage (20) extending transversely therethrough. The passage (20) has centrally located parallel inner surfaces (26) and (27) which are normal to the axis of the lever (18) and locatable on opposite sides of the rail (4). The passage (20) is outwardly inclined from the edges of the surfaces (26) and (27) to the edges of the lever (18). Provided across the passage (20) respectively at opposite edges of the surfaces (26) and (27) is a first pair of line contact points (23A) and (23B).

The pair line contact points (23A) and (23B) are parallel and respectively locatable against and on opposite sides of the rail (4). When so located, the line contact points (23A) and (23B) are spaced apart along the length of the rail (4) as shown. This provides the required over center cross-corner friction lock between the lever (18) and the rail (4).

A pair of line contact points (25A) and (25B) are similarly provided at the other edges of surfaces (26) and (27) and will engage the rail (4) as required when the apparatus is set for rearward movement as described with reference to FIG. 3.

The lever (18) can conveniently be cast from suitable steel. Where this is done, the passage (20) will be cast with grooves for hard metal line inserts (28) which will be brazed in position to provide the line contact points (23A), (23B), (25A) and (25B). Cylindrical tungsten carbide inserts will be suitable for this application.

Hard metal inserts can also be provided where the lever (18) contacts a fulcrum or biasing means of the apparatus. The engaging surfaces of the lever (18) in FIGS. 1 to 3 may also be provided by hard metal inserts.

The housing (6) and oscillating member (not shown) can be supported as required spaced apart from the rail (4) in any suitable manner. The following is a convenient arrangement for such support where a percussion drill is to be advanced along the rail (4). An elongate platform is provided with the rail (4) extending along one side thereof. The lever (18) will extend laterally from the rail (4) to the housing (6) which is located above and substantially in the center of the platform. The drill will be secured above the housing and in line with the platform. Supports for the drill will extend from guides which on the one side of the platform slidably engage the rail and on the other side, slidably engage over the platform's edge. The drill will in use be slidable along and spaced apart from the rail and platform as the action of the lever (18) advances it along the rail (4). In this example, it will be convenient for the engaging formation (20) to be a passage open to the underside of the lever (18). The lever (18) can then be lowered with its engaging formation (20) onto the rail (4) at any position along the rails length. The underside of the rail (4) can then also be secured to the platform without interfering with the advance of the lever (18) along its length. The platform with the rail (4) can be secured in any position desired for drilling.

With such an arrangement of the rail (4) with a laterally extending lever (18), the drawings will represent a plan view of the apparatus (2). FIG. 4 shows the engaging formation to be a passage (20) which is open to the underside of the lever (18) providing a yoke to engage over the rail (4) as described with reference to this arrangement.

The advance mechanism of the invention is based on a friction drive on a rail provided by applying force to an over center cross-corner locking lever in one direction to produce a friction lock on the rail and then applying force in the return direction by means of a second bias that unlocks the engagement with the rail and allows the lever slip along the rail. In this way the lever forms a walking thrust arm for an oscillating member.

The specific configuration of the engaging formation (20), with or without hard metal inserts, will be selected to be conducive to the required frictional engagement of the rail (4) while also affording maximum rail life. It will be appreciated that the rail (4) may take any of a number of forms and may be of a different cross-sectional shape to the one described. It may for example be round. The engaging formation (20) will then also be varied for use with such a rail.

It will be appreciated that the advance afforded by the described embodiments of the apparatus is finite as is desirable when used with a drill. The rail need not be straight and can be curved to follow a non-linear path where this is desired. Furthermore, the housing may support a carriage to which the drill casing is secured or it may be provided by the drill casing itself.

It will also be appreciated that the apparatus may be used to move a rail in relation to an oscillating member. Where a circular rail is used with such an arrangement the apparatus can be used to impart rotary motion.

A person skilled in the art will appreciate that variations can be made to the embodiments described and that there are a number of alternative applications for which either the described or other embodiments may be used without falling outside the scope of the current invention. It will also be appreciated that a number of variations can be made to the specific configuration of the components of the apparatus described and that these variations will still fall within the scope of the current invention.

The invention claimed is:

1. An apparatus for converting backward and forward oscillations of an oscillating member into relative movement of the member along a rail, comprising a housing securable to an oscillating member and guided for movement relative to a rail, the housing providing a first fulcrum and a first biasing means spaced apart along the length of a lever, the lever having a rail engaging formation spaced along its length from the first fulcrum, the first biasing means resiliently biasing the lever about the first fulcrum for the engaging formation to grip the rail resisting movement in a backward direction, the resilient bias of the first biasing means selected to be overcome for the engaging formation to release the rail for movement in a forward direction and the first fulcrum providing a second biasing means that resiliently biases the lever about a second fulcrum provided by the housing for movement in the backward direction, wherein the first biasing means and the second biasing means are piston and cylinder assemblies with the pistons contacting the lever.

2. An apparatus as claimed in claim 1, wherein the fulcrums engage the lever between their respective biasing means and the engaging formation of the lever.

3. An apparatus as claimed in claim 1, wherein the piston and cylinder assemblies are hydraulic or pneumatic.

4. An apparatus as claimed in 3, wherein the piston and cylinder assemblies are each connected to a pressurized fluid source with the effective area of the piston and cylinder of the first biasing means greater than that of the piston and cylinder of the second biasing means and a control valve provided between the first biasing means and a fluid source.

5. An apparatus as claimed in claim 1, wherein the lever has outwardly curved formations which are respectively engaged by the pistons.

6. An apparatus as claimed in claim 1, wherein the engaging formation is a passage through the lever.

7. An apparatus as claimed in claim 1, wherein the engaging formation is provided as a yoke engageable onto the rail.

8. An apparatus as claimed in claim 1, wherein the rail has a rectangular cross section.

9. An apparatus as claimed in claim 1, wherein the engaging formation provides a pair of parallel opposed line contact points locatable on opposite sides of the rail and spaced apart along the length of the rail.

10. An apparatus as claimed in claim 1, wherein the engaging formation provides a pair of opposed engaging surfaces that are transversely inclined relative to the axis of the lever, locatable on opposite sides of the rail and offset along the length of the rail.

* * * * *

UNITED STATES PATENT AND TRADEMARK OFFICE
CERTIFICATE OF CORRECTION

PATENT NO. : 7,426,966 B2  Page 1 of 1
APPLICATION NO. : 10/552942
DATED : September 23, 2008
INVENTOR(S) : Rudolph Buhrmann It is certified that error appears in the above-identified patent and that said Letters Patent is hereby corrected as shown below:

Claim 4, Column 6, line 29, "in 3", should read --in claim 3--.

Signed and Sealed this

Twenty-fourth Day of March, 2009

JOHN DOLL
*Acting Director of the United States Patent and Trademark Office*